United States Patent [19]

Stevenson

[11] Patent Number: 5,958,531
[45] Date of Patent: Sep. 28, 1999

[54] PEELABLE AND HEAT SEALABLE LIDSTOCK MATERIAL FOR STEEL END CONTAINERS

[75] Inventor: James A. Stevenson, Pittsburgh, Pa.

[73] Assignee: Aluminum Company of America, Pittsburgh, Pa.

[21] Appl. No.: 08/978,222

[22] Filed: Nov. 25, 1997

[51] Int. Cl.⁶ .................................................. B65D 41/20
[52] U.S. Cl. ................ 428/35.8; 428/35.7; 428/344; 428/403; 428/461; 428/463; 428/483; 428/522; 428/523; 220/359; 215/232
[58] Field of Search .................. 428/35.7, 35.8, 428/344, 352, 403, 461, 66.3, 41.3, 355, 349, 463, 483, 522, 523; 220/359; 215/232

[56] References Cited

U.S. PATENT DOCUMENTS

| | | | |
|---|---|---|---|
| 4,189,519 | 2/1980 | Ticknor | 428/476 |
| 4,870,134 | 9/1989 | Hwo | 525/221 |
| 5,024,888 | 6/1991 | Hwo et al. | 428/355 |
| 5,066,543 | 11/1991 | Hwo | 428/412 |
| 5,626,929 | 5/1997 | Stevenson | 428/35.8 |

OTHER PUBLICATIONS

Shell Polybutylene Resins for Easy Open Packaging, Shell Chemical Company, Dec. 1991.

Primacor Adhesive Polymers—Extrusion Coating Grade Resins, Dow Chemical Company, Aug. 1987.

*Primary Examiner*—Charles Nold
*Attorney, Agent, or Firm*—Glenn E. Klepac

[57] ABSTRACT

A peelable and heat sealable lidstock material for steel end containers. The container of the invention is suitable for holding various foods, including instant coffee, powdered baby formula and soup mixes. The lidstock material includes a film containing an ethylene-carboxylic acid copolymer, polybutylene and a particulate inorganic filler.

17 Claims, 3 Drawing Sheets

PEELABLE AND HEAT SEALABLE LIDSTOCK MATERIAL FOR STEEL END CONTAINERS

FIELD OF THE INVENTION

The present invention relates to an improved lidstock material for making lids on containers having steel ends.

BACKGROUND OF THE INVENTION

Containers having steel ends are used for foods such as instant coffee, baby formulas and soup mixes. The containers may have tin-plated steel bodies or composite, spiral wound bodies with a steel ring around an open end portion of the container.

Peelable and heat sealable lids for steel end containers are known in the prior art. However, there is still a need to provide such containers with lids having the following combination of properties: (a) approximately constant peel strength over a wide range of heat seal temperatures; (b) cohesive failure in the heat seal layer upon peeling; and (c) high burst strength in the sealed lid.

A principal objective of the present invention is to provide a film suitable for making steel end container lids having a combination of constant peel strength, cohesive failure in the seal layer and high burst strength.

A relative objective of the invention is to provide lidstock material comprising a substrate laminated with a film containing a mixture of an ethylene-carboxylic acid copolymer, polybutylene, and a particulate inorganic filler.

Additional objectives and advantages of my invention will become apparent to persons skilled in the art from the following detailed description.

SUMMARY OF THE INVENTION

In accordance with the present invention, there is provided a peelable and heat sealable lidstock material for steel end containers. The container of the invention is suitable for holding various foods, including instant coffee, powdered baby formula and soup mixes.

As used herein, "lidstock material" refers to a metal or polymer substrate laminated with a heat seal layer or film. Lidstock material of the invention is made into food container lids by cutting the material from a sheet into a desired shape, such as a circular disc or a rectangle.

As used herein, the term "peelable" refers to the capacity of a sealed lid to separate and to release from sealed engagement with its underlying container while each substantially retains its integrity. Such separation and release are generally achieved by a separating force applied manually to an outer edge portion of the sealed container.

As used herein, the term "heat sealable" refers to the ability to form a bond between a metal upper edge portion of a food container and its lid when heat and pressure are applied locally for a sufficient time. The bond is gas-tight and preferably has sufficient burst strength to resist separation from the container.

The lidstock material of the present invention comprises a metal or polymer substrate laminated with a film comprising a mixture of polymers and an inorganic filler. A polymer substrate may be made from biaxially oriented polyethylene terephthalate (PET). The substrate is preferably aluminum foil having a thickness of about 0.25 mil to 3.0 mils (0.00025 inch to 0.003 inch). Aluminum foil is preferred because it provides an excellent barrier against penetration of gases and moisture. In addition, the foil protects the film and container contents from ultraviolet light and has an aesthetically pleasing appearance. A particularly preferred aluminum foil substrate has a thickness of about 2.0 mils (0.002 inch).

The heat seal film has a total weight of about 15 to 30 pounds per 3000 square feet. A particularly preferred film has a weight of about 17 pounds per 3000 square feet, corresponding to a thickness of approximately 1 mil (0.001 inch).

The aluminum foil substrate is preferably provided with a print primer on a side opposite the film. The print primer facilitates application of printed labeling on the substrate. A particularly preferred print primer has a coating weight of about 0.7 pound per 3000 square feet.

The container body includes a bottom wall and a side wall extending outwardly of the bottom wall. The bottom wall may be metal or a polymer and is preferably metal. The side wall may be metal, a polymer or spiral wound paperboard. An upper edge portion or upper lip of the side wall is metal, preferably steel or aluminum. A particularly preferred container body has a steel bottom wall, a spiral wound paperboard side wall attached to the bottom wall and extending outwardly thereof, and a steel end around an upper edge portion of the side wall. The paperboard side wall is preferably laminated with at least one aluminum foil layer.

The film on the lidstock material comprises a mixture of an ethylene-carboxylic acid copolymer, polybutylene and a particulate inorganic filler.

Some suitable inorganic fillers include talc, amorphous silica and alumina trihydrate. The filler enhances peelability of the coating by shifting seal failure upon peeling from adhesive failure at the container-coating layer interface to cohesive failure in the coating layer itself. The filler comprises at least about 18 wt. % of the coating, preferably about 20–40 wt. %, more preferably about 20–30 wt. % and optimally about 25 wt. %. The filler is preferably a powder having an average particle size of about 0.5–10 microns. Talc particles having an average particle size of about 1–2 microns are particularly preferred. The talc is preferably mixed with a saturated carboxylic acid. The talc is preferably provided with a surface coating comprising about 0.5–5 wt. % of the filler, more preferably about 1 wt. %.

The carboxylic acid in the surface coating may be a mono- or di-carboxylic acid or a mixture of such acids. Some preferred acids include stearic acid and isostearic acid, which is a liquid mixture of mostly $C_{18}$ saturated fatty acids having the general formula $C_{17}H_{35}COOH$. Other saturated $C_{10}$–$C_{20}$ carboxylic acids or mixtures thereof may also be useful.

The mixture preferably comprises about 35–70 wt. % of an ethylene-carboxylic acid copolymer. As used herein, the term "ethylene-carboxylic acid copolymer" refers to copolymers having the molecular formula:

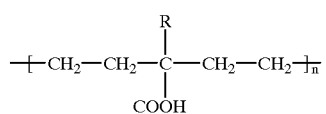

wherein R may be H or a $C_1$–$C_4$ alkyl group. Some polymers within the scope of this term include, but are not limited to, the following copolymers: ethylene-acrylic acid (EAA); ethylene-methyl acrylic acid (EMAA); ethylene-ethyl acrylic acid (EEAA); ethylene-propyl acrylic acid (EPAA); and ethylene-butyl acrylic acid (EBAA).

More preferably, the mixture comprises about 45–65 wt. % of the copolymer. A particularly preferred mixture contains about 55 wt. % of an ethyleneacrylic acid copolymer (EAA).

The EAA copolymer suitably contains about 4–12 wt. % acrylic acid (AA) units, remainder ethylene units. Some preferred EAA copolymers are sold by The Dow Chemical Company of Midland, Mich. under the trademark "Primacor". The EAA copolymers have properties as shown in Table 1 wherein melt index is measured according to ASTM D-1238 and AA content is determined by direct titration.

TABLE 1

Properties of EAA Copolymers

| Copolymer | Melt Index (g/10 min) | Density (g/cm$^3$) | AA Content (wt. %) |
|---|---|---|---|
| Primacor 1410 |  | 0.938 | 9.0 |
| Primacor 3330 | 5.5 | 0.932 | 6.5 |
| Primacor 3340 | 9.0 | 0.932 | 6.5 |
| Primacor 3440 | 10.0 | 0.938 | 9.5 |

The mixture preferably comprises about 10–40 wt. % polybutylene, more preferably about 15–30 wt. %. A particularly preferred mixture contains about 20 wt. % shell polybutylene 1710SA.

As used herein, the term "polybutylene" refers to crystalline polymers having a major proportion of 1-butene monomers with about 1–25mole % of other monomeric units such as ethylene, propylene, 1-hexene, 4-methyl-1-pentene, 1-octene, and 1-decene units. Such polymers, although technically copolymers, are known and understood in the art as polybutylene. For practice of the present invention, a copolymer of 1-butene and ethylene is preferred.

A particularly preferred polybutylene is sold by Shell Chemical Company of Houston, Texas as polybutylene 1710SA. This polymer has a melt index of about 1.0 g/10 min as measured by ASTM D-1238, a density of about 0.909 g/cm$^3$ and a melting point of about 116° C. (241° F.).

DETAILED DESCRIPTION OF PREFERRED EMBODIMENTS

Figure 1:
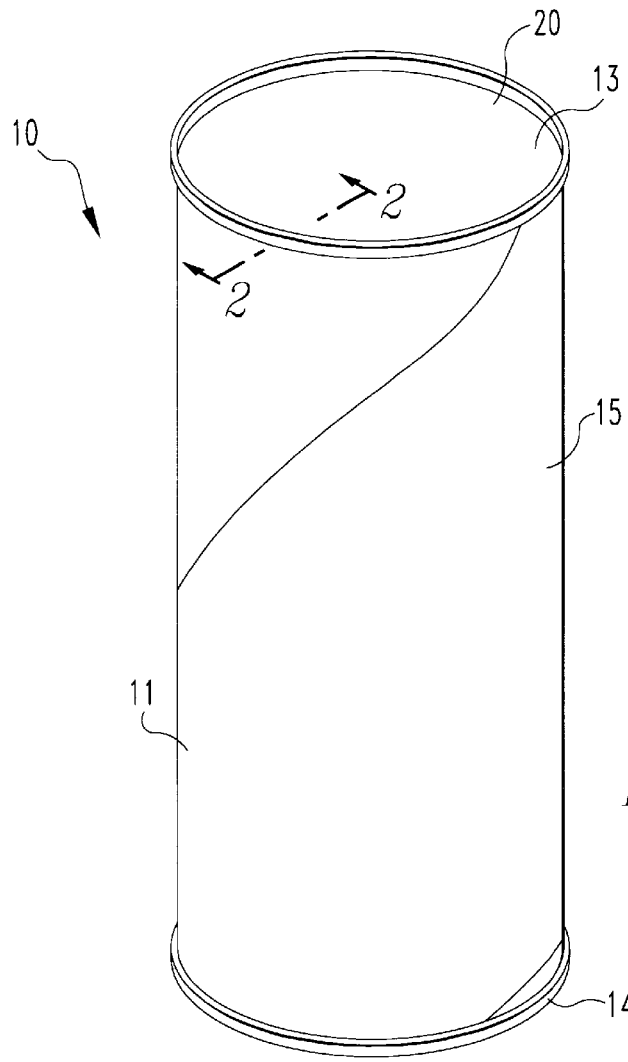
FIG. 1 is a perspective view of a food container made in accordance with the present invention.

There is shown in FIG. 1 a perspective view of a food container 10 made in accordance with the present invention. The container 10 has a body 11 that defines a cavity 13 for a food product such as instant coffee, a soup mix or powdered baby formula. The body 11 includes a bottom wall 14, a side wall 15 and a lid 20. The bottom wall 14 is steel and the side wall 15 is a spiral wound laminate of paperboard and aluminum foil.

Figure 2:
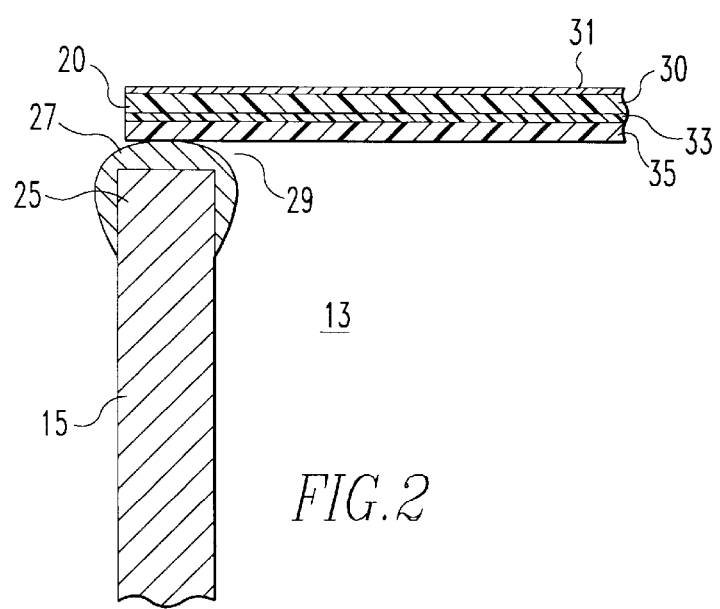
FIG. 2 is an enlarged, fragmentary, cross-sectional view taken along the lines 2—2 of FIG. 1.

As seen in FIG. 2, the side wall 15 has an upper edge 25 covered by a steel ring or steel end 27 extending circumferentially around an opening 29. The lid 20 is peelably heat sealed to the steel end 27.

The lid 20 is made from a lidstock material comprising an aluminum foil substrate 30, a print primer 31 over the substrate 30, a polyurethane adhesive layer 33, and a film 35 over the adhesive layer 33. The foil substrate 30 has a thickness of about 2.0 mils (0.002 inch). The print primer 31 has a weight of about 0.7 pound per 3000 square feet. The adhesive 33 has a weight of about 2.4 pounds per 3000 square feet. The film 35 has a thickness of about 1 mil corresponding to a weight of about 17 pounds per 3000 square feet. A single layer of the film 35 is laminated to the substrate 30 under heat and pressure. Alternatively, the film 35 may be extrusion coated onto the substrate 30.

A particularly preferred film 35 on the lid 20 has composition A shown in the Table below. Some other acceptable compositions (B and C) are also shown in the Table.

TABLE 2

Film Composition

| Ingredient | Amount (wt. %) | | |
|---|---|---|---|
|  | A | B | C |
| Ethylene-acrylic acid copolymer | 55 | 45 | 65 |
| Polybutylene | 20 | 30 | 10 |
| Talc | 25 | 25 | 25 |
| Total | 100 | 100 | 100 |

Some tests were performed on the lidstock material of the present invention, including a 1 mil thick cohesive film laminated with an aluminum foil substrate having a thickness of about 2.0 mils. The cohesive film contains 55 wt. % of an ethylene-acrylic acid copolymer; 20 wt. % polybutylene and 25 wt. % talc. For comparison, some prior art commercially available adhesive coatings on 2.0 mil aluminum foil were also tested. Prior art coatings A and B contain a polyester/vinyl acrylic blend and coatings C and D contain an acrylic adhesive.

Figure 3:
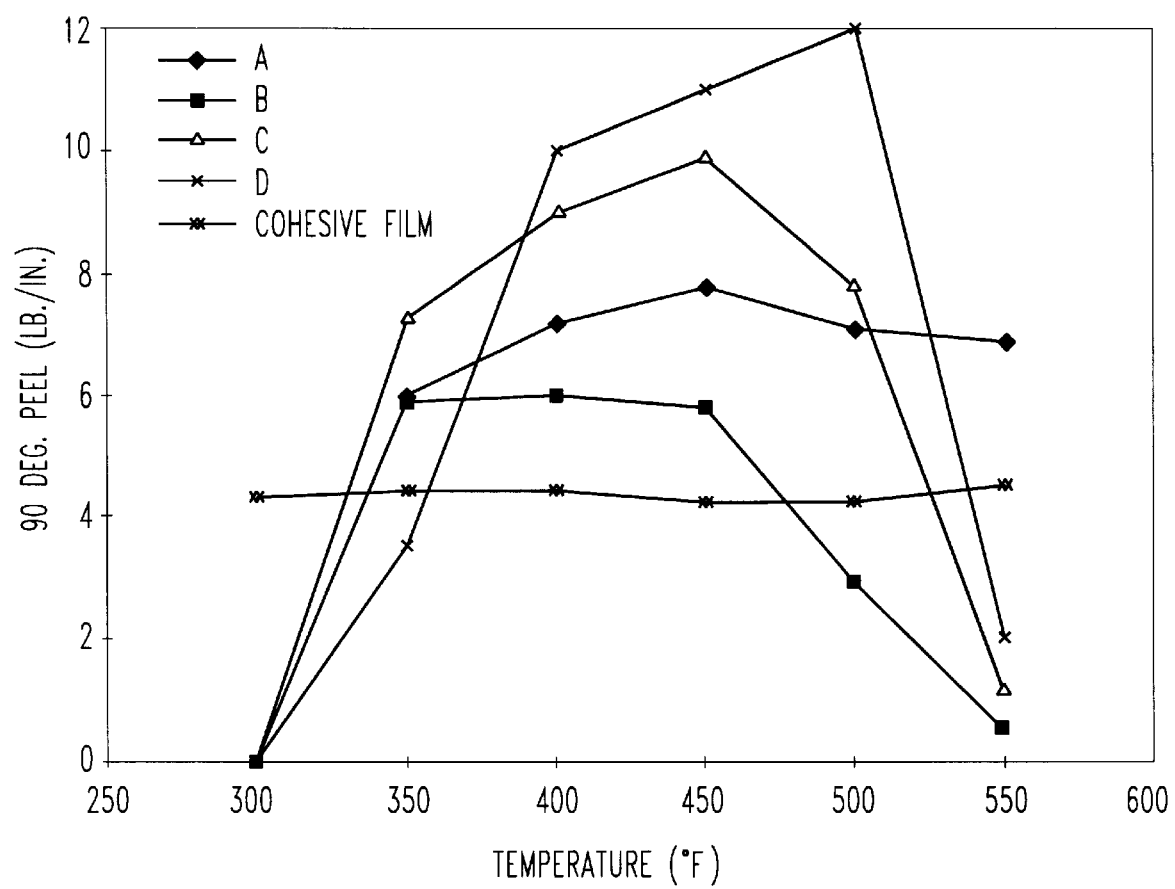
FIG. 3 is a graph showing peel strength as a function of heat seal temperature.

Strips of lidstock material were heat sealed to polypropylene homopolymer strips at 40 psi with a 0.6 second dwell time. Peel strength was measured at a 90° angle as a function of heat seal temperature. As shown in FIG. 3, the cohesive film of the present invention showed constant peel strength over the entire 300°–500° F. heat seal range tested whereas all four prior art coated samples showed considerable variation in peel strength as a function of temperature.

Figure 4:
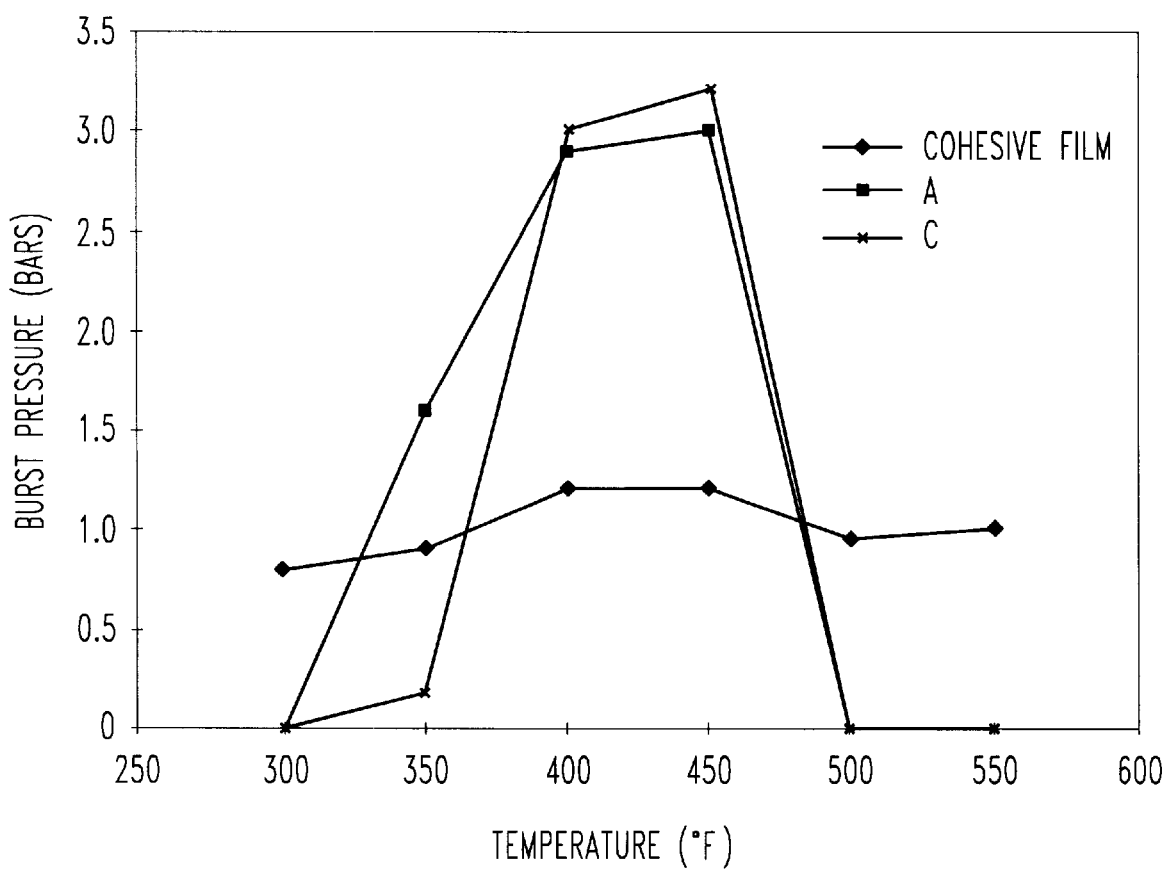
FIG. 4 is a graph showing burst pressure as a function of heat seal temperature.

Burst pressure was also measured as a function of heat seal temperature. As shown in FIG. 4, samples made with the cohesive film of the present invention demonstrated much less variation in burst pressure over the 300°–550° F. heat seal temperature range than the prior art polyester/vinyl acrylic blend and the acrylic adhesive coatings.

The foregoing description of my invention is made by reference to some preferred embodiments. Persons skilled in the art will understand that the claimed film, lidstock material and food container can all be modified in various ways without departing from the spirit and scope of the following claims.

What is claimed is:

1. A film suitable for lamination with a metal or polymer substrate to form a lidstock material characterized by a cohesive peel when heat sealed to steel, said film comprising:

(a) about 35–70 wt. % of an ethylene-carboxylic acid copolymer;

(b) about 10–40 wt. % polybutylene; and (c) at least about 18 wt. % of a particulate inorganic filter.

2. The film of claim 1 comprising:

(a) about 45–65 wt. % of the ethylene-carboxylic acid copolymer;

(b) about 10–30 wt. % of the polybutylene; and (c) about 20–30 wt. % of the filler.

3. The film of claim 1 wherein said copolymer is an ethylene-acrylic acid copolymer.

4. The film of claim 1 wherein said film is substantially planar.

5. The film of claim 1 wherein said film has a thickness of about 0.5–3 mils.

6. The film of claim 1 wherein said inorganic filler is selected from the group consisting of talc, silica and alumina.

7. The film of claim 1 wherein said filler comprises talc and further comprising a carboxylic acid.

8. The film of claim 1 wherein said filler comprises talc and further comprising about 0.5–5 wt. % (based on the weight of the talc) of a carboxylic acid.

9. The film of claim 1 wherein said filler has an average particle size of about 0.5–10 microns.

10. The film of claim 1 wherein the polybutylene is a copolymer containing a major proportion of 1-butene units and a minor proportion of other units.

11. The film of claim 1 wherein the polybutylene is a copolymer containing about 1–25 mole % ethylene units and about 75–99 mole % 1-butene units.

12. A peelable and heat sealable lidstock material comprising a metal or polymer substrate laminated with the film of claim 1.

13. The material of claim 10 wherein said film consists of a single layer.

14. A container comprising:

(a) a body having an upper edge portion defining an opening, said upper edge portion comprising a metal selected from steel and aluminum; and (b) a lid comprising a metal or polymer substrate heat sealed to said upper edge portion by a cohesively feeling film comprising:

(i) about 35–70 wt. % of an ethylene-carboxylic acid copolymer;

(ii) about 10–40 wt. % of a polybutylene; and (iii) at least about 18 wt. % of a particulate inorganic filler.

15. The container of claim 14 wherein said filler is selected from the group consisting of talc, silica and alumina.

16. The container of claim 14 wherein the polybutylene is a copolymer of 1-butene and ethylene.

17. The container of claim 14 wherein said upper edge portion comprises steel.

* * * * *